United States Patent
Lammel et al.

(10) Patent No.: US 9,383,234 B2
(45) Date of Patent: Jul. 5, 2016

(54) SENSOR TIME SYNCHRONIZATION

(71) Applicant: Robert Bosch GmbH, Stuttgart (DE)

(72) Inventors: Gerhard Lammel, Tuebingen (DE); Rudolf Bichler, Reutlingen (DE); Guido Retz, Pliezhausen (DE); Rainer Dorsch, Dettenhausen (DE)

(73) Assignee: ROBERT BOSCH GMBH, Stuttgart (DE)

( * ) Notice: Subject to any disclaimer, the term of this patent is extended or adjusted under 35 U.S.C. 154(b) by 0 days.

(21) Appl. No.: 14/396,340

(22) PCT Filed: Apr. 2, 2013

(86) PCT No.: PCT/EP2013/056954
§ 371 (c)(1),
(2) Date: Oct. 22, 2014

(87) PCT Pub. No.: WO2013/160073
PCT Pub. Date: Oct. 31, 2013

(65) Prior Publication Data
US 2015/0077217 A1    Mar. 19, 2015

(30) Foreign Application Priority Data

Apr. 27, 2012  (DE) .......................... 10 2012 207 138

(51) Int. Cl.
*G01D 18/00* (2006.01)
*G01D 3/02* (2006.01)

(52) U.S. Cl.
CPC .............. *G01D 18/004* (2013.01); *G01D 3/022* (2013.01)

(58) Field of Classification Search
CPC . H04W 88/022; H04W 52/0216; H04W 4/00; H04W 4/206; H04W 84/022; H04W 88/02
USPC .......................................................... 340/4.2
See application file for complete search history.

(56) References Cited

U.S. PATENT DOCUMENTS

| | | | |
|---|---|---|---|
| 5,918,194 A * | 6/1999 | Banaska ................ | G01D 3/022 340/3.1 |
| 6,487,787 B1 | 12/2002 | Nahum et al. | |
| 7,031,863 B2 | 4/2006 | Maher et al. | |
| 7,382,780 B1 * | 6/2008 | Moretti ............... | H04L 12/5601 370/395.1 |
| 8,050,881 B1 * | 11/2011 | Yeung ................... | A61B 5/0024 370/503 |
| 2005/0137821 A1 | 6/2005 | Maher et al. | |
| 2011/0164163 A1 * | 7/2011 | Bilbrey ................ | G06F 1/1694 348/333.01 |

FOREIGN PATENT DOCUMENTS

| | | |
|---|---|---|
| CN | 102217326 A | 10/2011 |
| EP | 1 493 997 | 1/2005 |
| EP | 1 548 417 | 6/2005 |

* cited by examiner

*Primary Examiner* — Mark Blouin
(74) *Attorney, Agent, or Firm* — Norton Rose Fulbright US LLP

(57) ABSTRACT

A sensor for acquiring measured values and for outputting data samples having at least one first register for storing a sensor time, which includes time information on phase position and/or period of the data samples, the first register being readable out externally. The sensor includes at least one second register, which is writable on externally, and by which the phase position and/or the period of the data samples is able to be set in the sensor. Also described is a sensor system having at least one sensor and an external control unit by which at least the first register is readable and at least the second register is writable. Also described is a sensor-fused system having at least one sensor system having at least two sensors. Also described is a method for setting the phase position and/or the period of data samples in a sensor system or a sensor-fused system.

7 Claims, 8 Drawing Sheets

SENSOR TIME SYNCHRONIZATION

FIELD OF THE INVENTION

The present invention relates to sensor time synchronization.

BACKGROUND INFORMATION

Synchronization of sensor data having display on mobile units is discussed, for instance, in Laid-Open Document US 20110164163 A1. There the discussion relates to the synchronization of sensors and augmented reality in general, and not the method of correcting individual data points and their time discrepancy among one another.

Patent document U.S. Pat. No. 8,050,881 B1 discusses the synchronization of a local clock in the sensor with another clock and interpolation of the times. In this context, only the points in time of (integral) measurements are taken into account, not the delay between the creation of the data and reading them out of the sensor. The asynchronism of different sensors among one another is also not taken into account or actively eliminated.

Patent document U.S. Pat. No. 7,382,780 B1 discusses a subsequent time synchronization with the aid of sample counters and a real time clock, as well as the combination to data frames.

Sensor data fusion requires a plurality of sensors in a system, from which a target quantity is calculated. For instance, from an initial position of a rigid body, the position at a later point in time may be calculated approximately by a value series from an acceleration sensor and a yaw sensor. Frequently, the system is even over-determined, e.g. at a fusion of data of an acceleration sensor, a yaw rate sensor and a geomagnetic field sensor, so that by using suitable filters, such as a Kalman filter, errors may be minimized. The algorithms, used in practice for calculating the target values, assume that the measured points of the individual sensors are equidistant and have no phase shift. The data rates are typically identical or are multiples of one another, e.g. in an acceleration sensor and a yaw rate sensor, which both supply sensor data at 100 Hz, the image in FIG. 1 is yielded.

The sensor data fusion typically takes place on systems which consist of a control unit and a plurality of sensors. FIG. 2 shows a possible layout of such a system. A number of sensors A to N is connected to a common control unit.

The control unit may be implemented in software on a processor or a microcontroller or in dedicated hardware. The sensors are typically made up of a MEMS element, an analog front end and a digital back end. The sensor typically supplies new data at a user-definable frequency and files them in the digital back end. The digital back end frequently includes a FIFO register in which the data are stored temporarily, as for example in a triaxial acceleration sensor BMA255 Digital of the firm Bosch Sensortec, so that the control unit has to fetch data less often, which may lead to energy savings. The sensors are typically not synchronized and the output data rate of the sensors is a function of environmental parameters, such as the temperature. The sensors supply asynchronous data, as shown schematically in FIG. 3.

These days, it is believed that the asynchronous sensor data are read out from the sensors, and the control unit puts a time stamp on the read instant, wherewith they are artificially synchronized. That leads to errors in the calculated target values in the sensor data fusion.

If the data are stored in the digital back end of the respective sensors in a FIFO, the synchronization is even more difficult, since the read instant is the same for all sensor data in the FIFO. If one calculates back using the data rate set in the sensor, the time stamps on the data may even diverge greatly. On this point, FIG. 4 shows an exemplary case in which the 11th element in the FIFO of sensor B is taken up after the 12th element in the FIFO of sensor A.

There are various possibilities of completely synchronizing different sensors.

A first possibility is the so-called forced mode. In this context, the sensors start a measurement when they are triggered via the digital interface by the control unit, for example, such as in the electronic compass BMCO50 of the firm Bosch Sensortec. This typically takes place by reading or writing on a register of the digital back end.

A second possibility is using an external synchronization terminal connection: In this context, the sensors, in addition to the digital interface, have an external pin, at which a synchronization signal from the control unit, another sensor or another component in the system is present.

If FIFO's are used, a partial synchronization is achieved in that a common FIFO is used for all sensors. The partial synchronization avoids the FIFO specific synchronization problem (the outdating of data) shown in FIG. 4. This solution is frequently used in systems which use a microcontroller as the sensor hub, as for example the ML610Q792 of the firm Lapis. In addition there are sensors which integrate a sensor hub having FIFO for all connected sensors in the digital back end, such as the yaw rate sensor MPU3050 of the firm Invensense.

The solutions of the synchronization problem presented above may, under certain circumstances, bring disadvantages with them. The forced mode makes real time demands on the control unit, which do not exist in the systems dominating the market today, and it is not to be expected that these will be satisfied in the future. The external sync pin causes additional costs in the sensor and, because of the wiring, also in the system.

SUMMARY OF THE INVENTION

The present invention relates to a sensor for acquiring measured values and for outputting data samples having at least one first register for storing a sensor time, which includes time information on phase position and/or period of the data samples, the first register being able to be read out externally. The crux of the present invention is that the sensor includes at least one second register, which is able to be written on externally, and by which the phase position and/or the period of the data samples is able to be set in the sensor.

The present invention also relates to a sensor system having at least one sensor according to the present invention and having an external control unit by which at least the first register is readable and at least the second register is writable.

The present invention also relates to a sensor-fused system having at least one sensor system according to the invention having at least two sensors according to the present invention.

The present invention also relates to a method for setting the phase position and/or the period of data samples in a sensor system according to the present invention or a sensor-fused system according to the present invention.

The present invention advantageously makes possible the synchronization of the sensor time with the time of the component which carries out the data fusion, typically the control unit. These days, the sensor normally already implements a sample timer, which is used internally, to determine when the sensor is starting a new measurement. This sample timer is broadened with a sample counter for the sensor time.

The control unit may advantageously measure very accurately the output data rates of the data samples with regard to their system clock, since sensor time (sample counter, sample timer) makes possible sub-sample accuracy. Thus, the fractional rational ratio of both clocks is ascertained. Thereupon the output rate of the sensor is adjusted, advantageously also sub-sample accuracy being used, that is, a fractional rational ratio may be set between the sensor clock and its output rate by the adjust register and/or the offset register.

A plurality of sensors is advantageously connected, for instance, via a data bus to a control unit and are synchronized to it. In this case, a common sensing of the data, for example, is advantageously possible. Similarly, adjusting using a bus clock pulse is possible, which simplifies the data transmission. In the devices according to the present invention, using the method according to the present invention, the data rates of sensors may advantageously be adjusted. In this instance, the sensor data are not synchronized subsequently, but the generation of the data in the sensor itself is regulated so that they take place synchronously.

DETAILED DESCRIPTION

Figure 1:
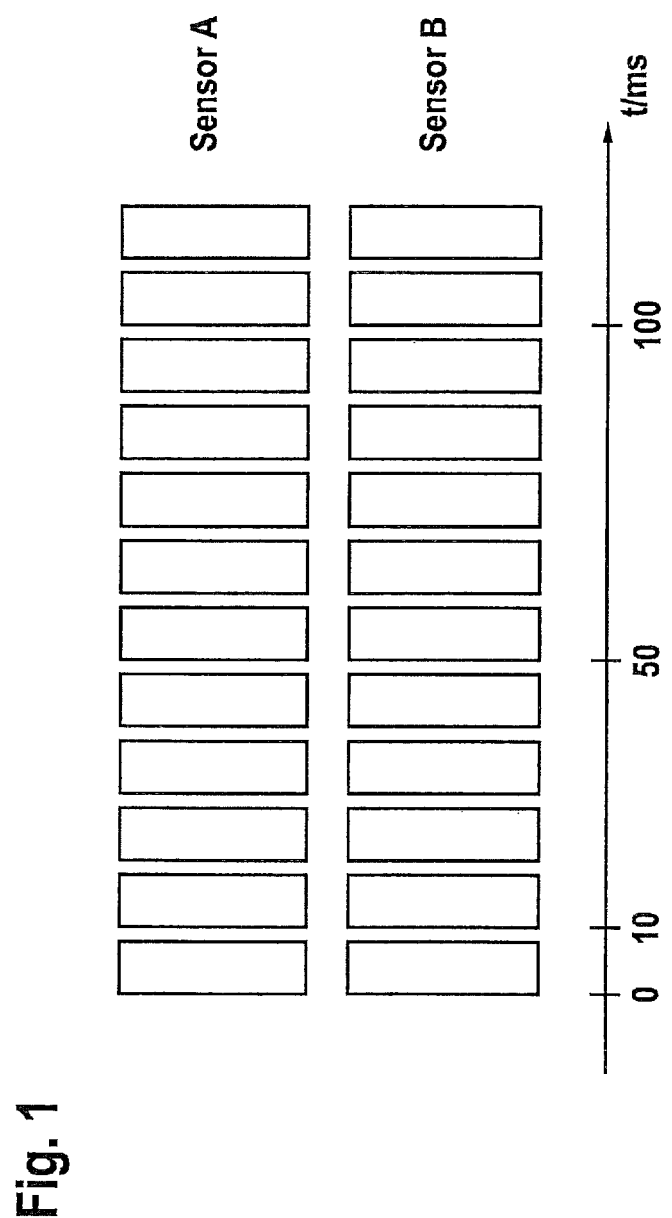
FIG. 1 shows schematically a synchronous data output of two sensors A and B in the related art with a sample of 10 ms each.
Figure 2:
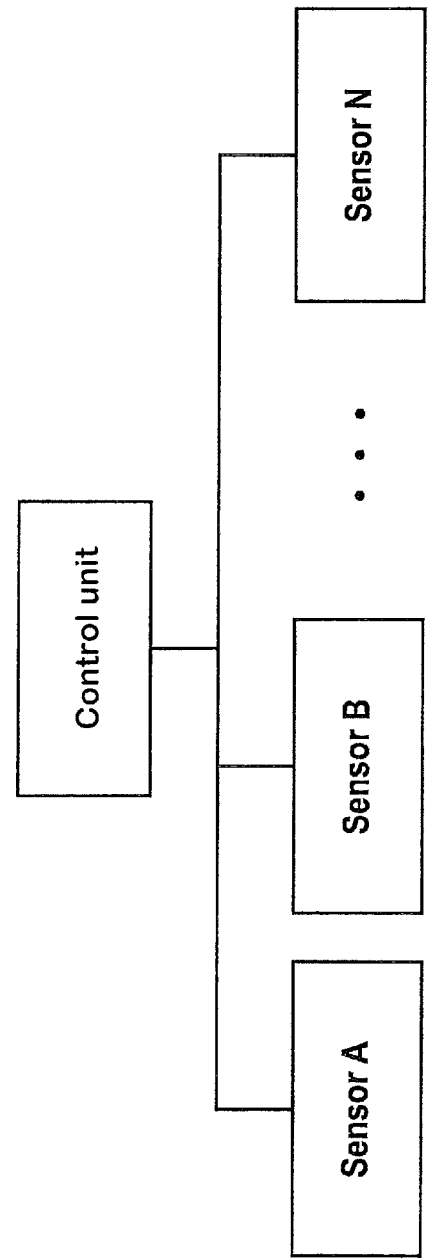
FIG. 2 shows a control unit having a plurality of sensors in the related art.
Figure 3:
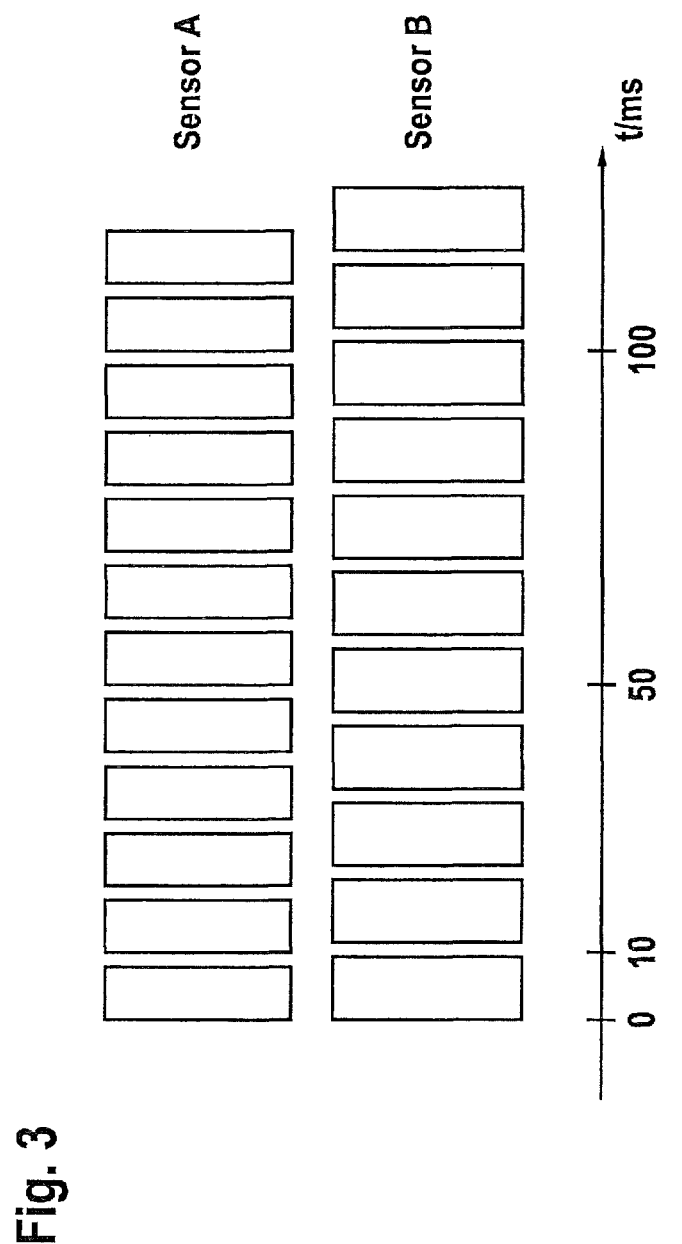
FIG. 3 shows schematically an asynchronous data output of two sensors A and B in the related art.
Figure 4:
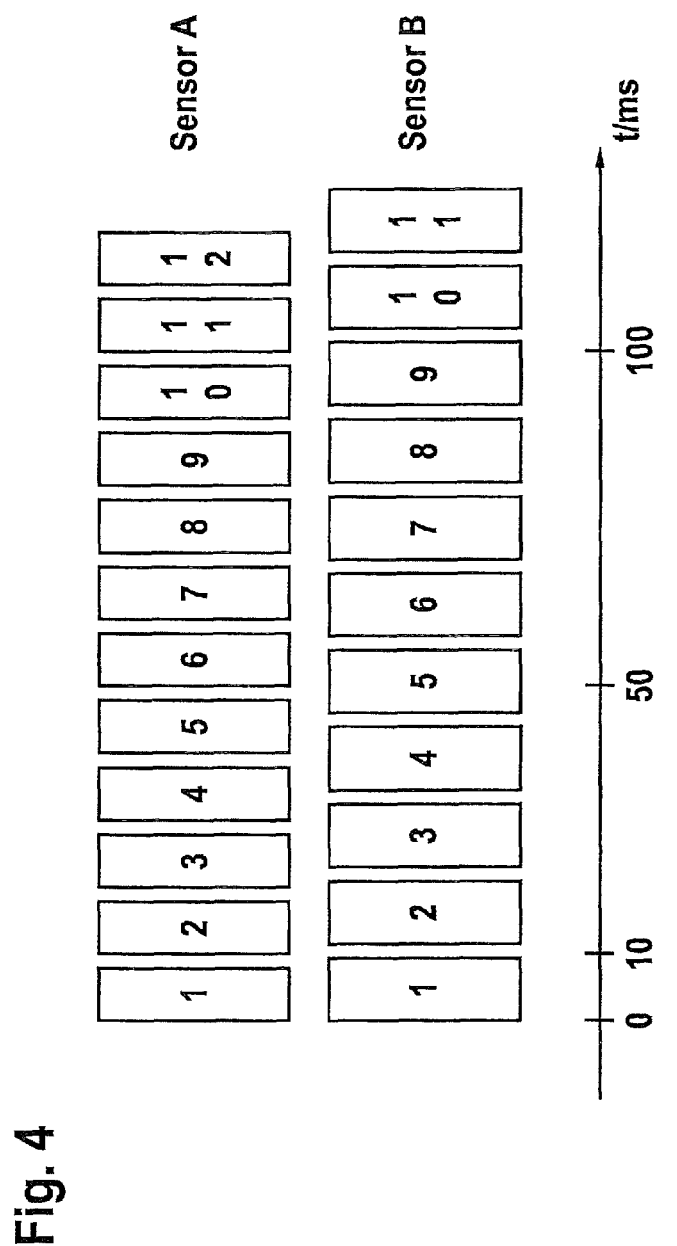
FIG. 4 shows schematically an asynchronous data output of two sensors A and B having FIFO storage in the related art.
Figure 5:
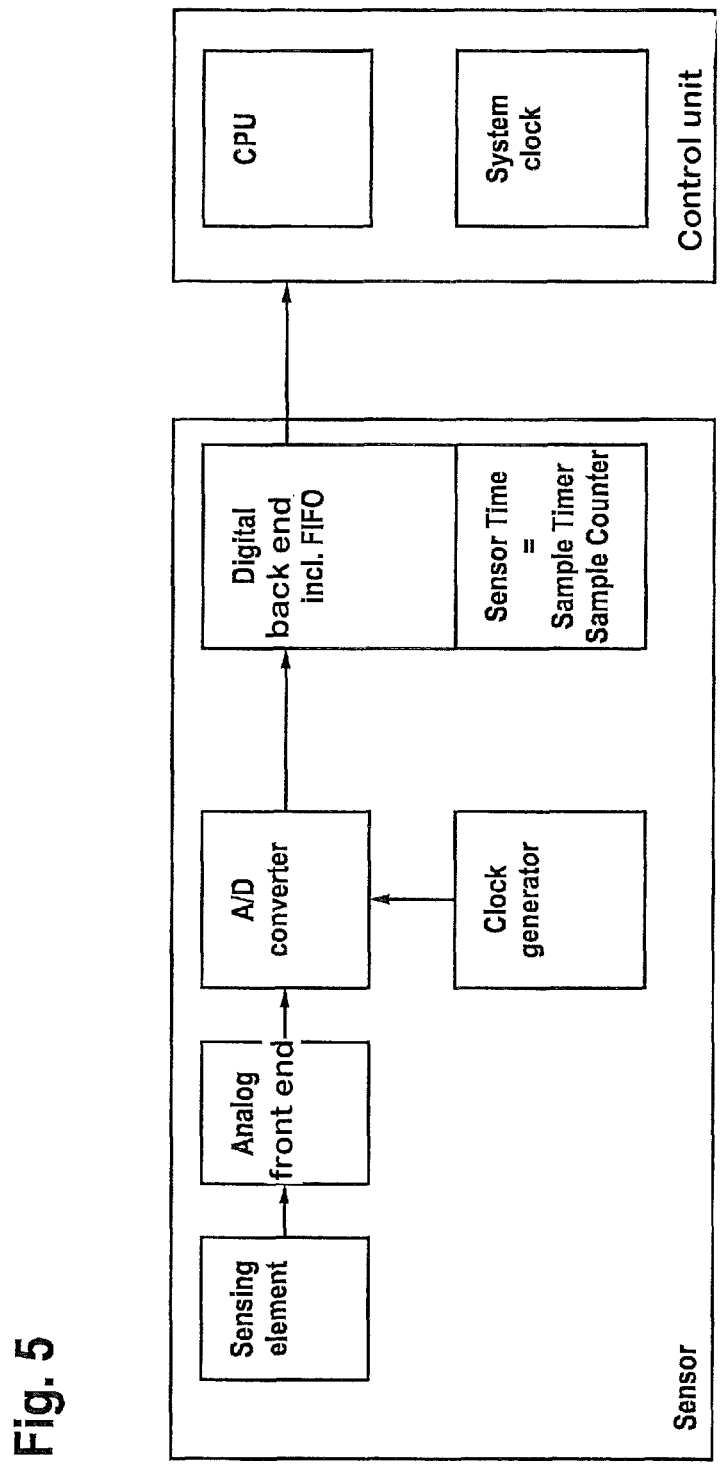
FIG. 5 shows a sensor having two externally accessible registers sample timer and sample counter, connected to a control unit.

FIG. 5 shows a sensor having two externally accessible sample timer and sample counter registers. It is known in the related art that one may provide sensors with a sample counter, in order to measure the time between data samples. For this purpose, the sample counter is available internally in the sensor. In the non-published German Patent Application DE 102012207026.5, a sensor is described which includes a sample timer register and a sampler counter register, as is shown in FIG. 5. The sample timer register includes the time period within a sample and is reset at the beginning of each new sample. The sample counter register counts the samples. The content of these two registers forms the sensor time, and is accessible from the outside, for instance, by a control unit. The sensor allows the control unit to read out the sensor time. From this, the control unit is able to assign to each sample of the data output of the sensor an accurate time stamp.

Figure 6:
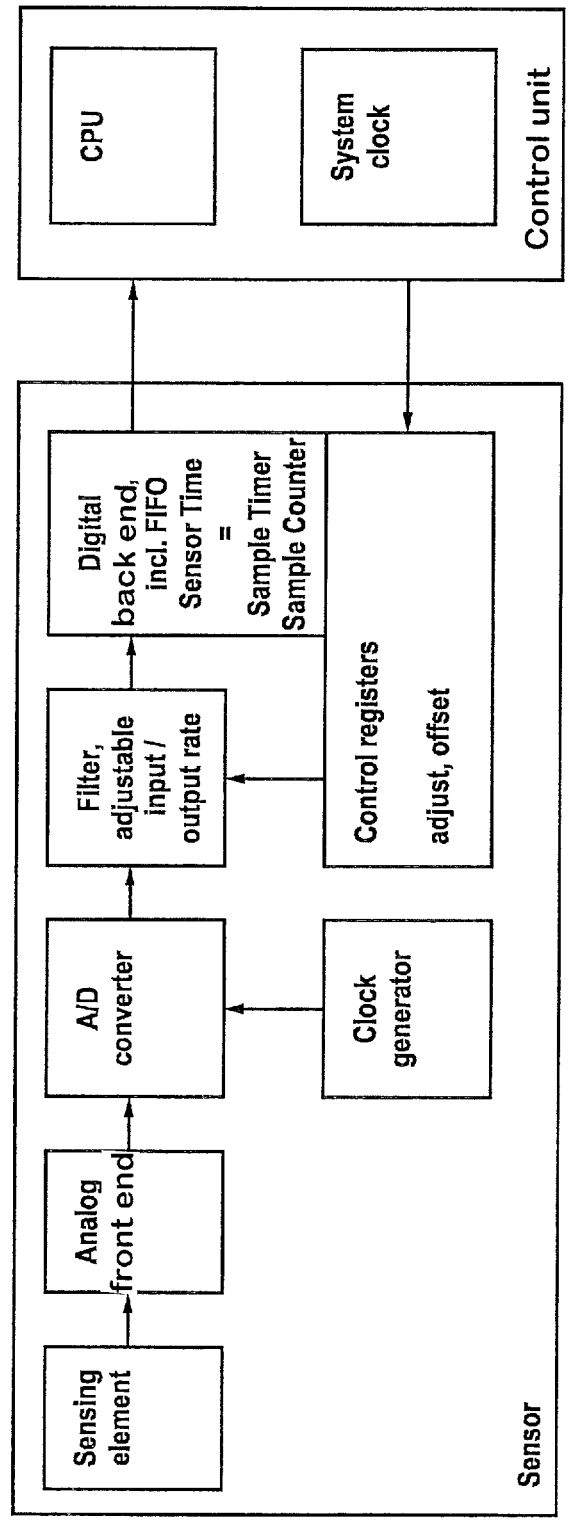
FIG. 6 shows a sensor according to the present invention having additional adjust and offset registers, connected to a control unit.

FIG. 6 shows a sensor according to the present invention having additional adjust and offset registers. The sensor according to the present invention has a measuring element (sensing elements) for acquiring the measured values, an analog front end for the analog processing of measured values, an analog/digital converter (ND converter) for the conversion, and a digital output part (digital back end) for the digital output of measured values. The measured values are provided as data samples at the output and may be stored temporarily in a FIFO storage, for example.

The sensor allows the component which carries out the data fusion, in this case the control unit, to read out the sensor time. According to the present invention, the sensor permits the control unit to write on the additional adjust and offset registers from the outside, and using these control registers, to control the data rate and the phase of the measurement in the sensor. Consequently, the control unit determines the phase position and the time period of the data acquisition in the sensor.

Figure 8:
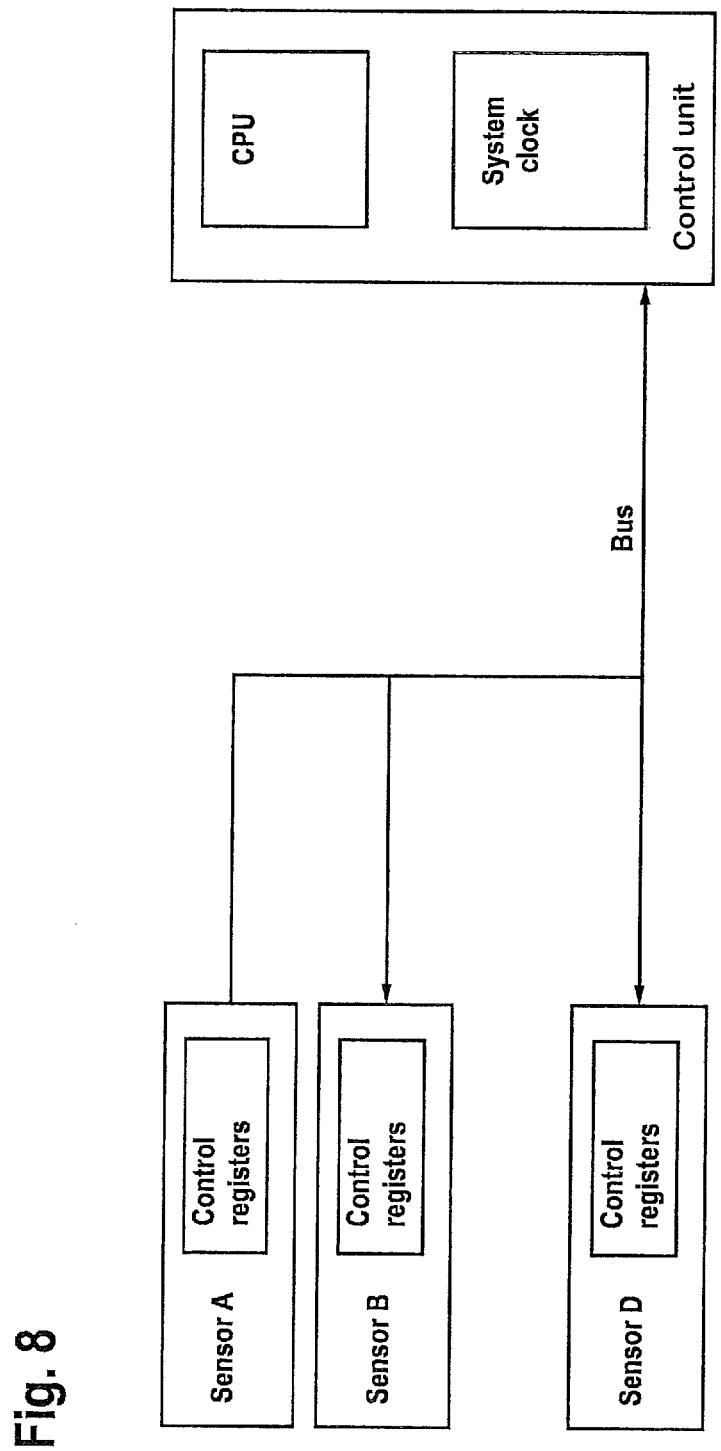
FIG. 8 shows a plurality of sensors according to the present invention having additional adjust and offset registers, connected to a control unit.

In a sensor-fused system having a plurality of sensors, it is thereby possible that all sensors in the system synchronously start and output their respective measurements, for example. FIG. 8 shows a plurality of sensors, according to the present invention, having additional adjust and offset registers, connected to a control unit, which are able to form such a sensor fused system By reading out the sensor time at two different times, the phase difference between the sensor clock and the system clock of the control unit is ascertained. This relationship of the two clocks is written as a correction factor into the adjust register or also the offset register in the sensor.

The data processing in this context is as follows:

Normally, an internal register (sample timer) in the ADC or the decimating filter within the sensor counts a whole number of clock cycles up to the output of a new data value.

In one example, the sample timer register counts from 0 to a stored final value of 2000. When it reaches 2000, a new data sample is generated, the sample counter register is incremented by 1 and the sample timer register is set back to 0.

In one specific embodiment of the present invention, the sensor has an adjust register. According to the present invention, the final value is formed flexibly programmably by the adjust register. At the beginning, the adjust register has the value 2000. Now, if, during the measurement of the phase difference, it is determined that the sensor runs 1% faster than the control unit, the final value in the adjust register is increased by 20 from 2000 to 2020, whereby the data rates become more alike.

In another specific embodiment of the present invention, the sensor has the adjust register having a decimal part in order to increase the accuracy further. The decimal places (mantissa) of the adjust register include the fractional values of the divider ratio of the correction factor, which is similar to fitting in a leap year in the calendar. Now, in the example given, the accurate final value does not amount to 2020 but 2020.25. If the adjust register has 8-bit fractional places (i.e. $\frac{1}{256}$ as a quantization step) and includes the value 64, then at the first 64 samples, in each case an additional clock pulse is fitted in, but no more at the next 192 clock pulses, so that, on the average, 2020.25 clock pulses of the sensor clock come about for one data point.

Figure 7:
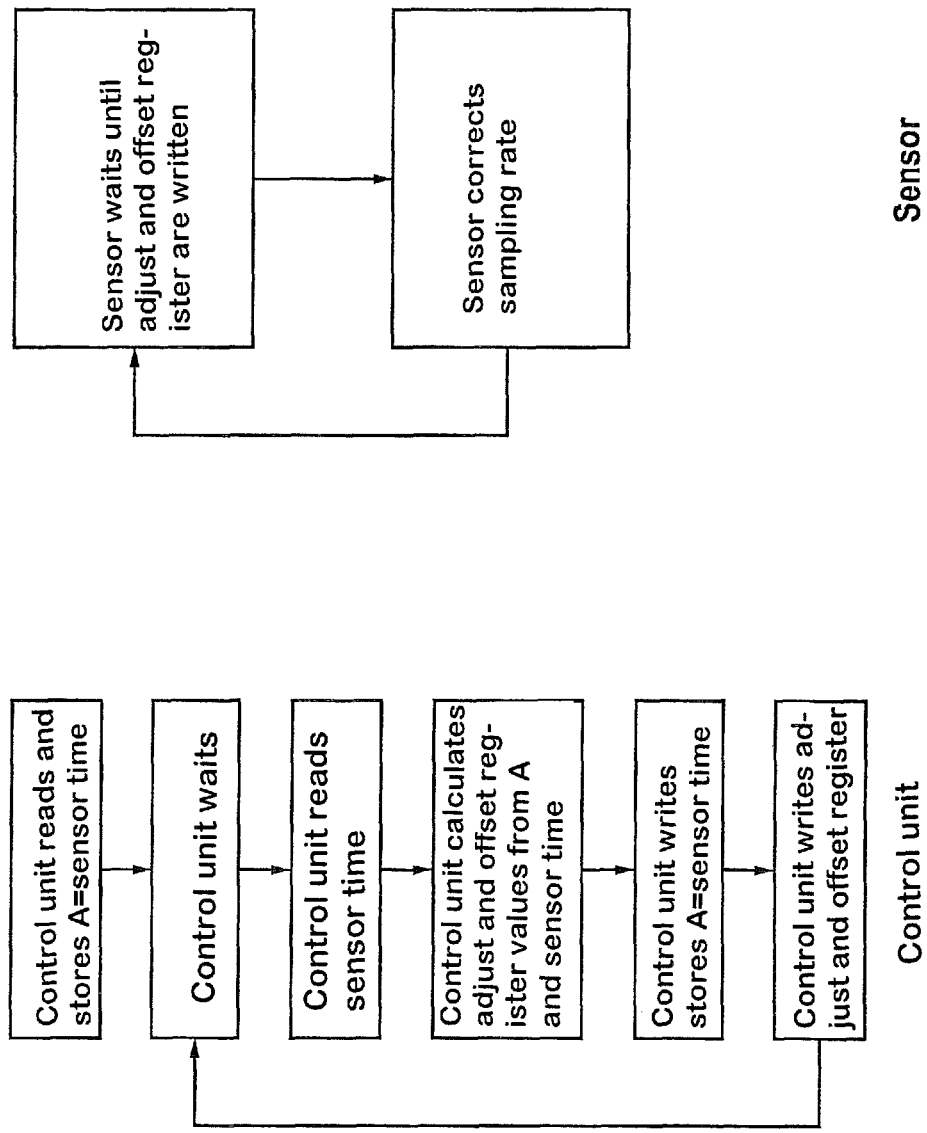
FIG. 7 shows schematically the sequence of communication between the control unit and a sensor of the method according to the present invention for the synchronization of the sensor.

FIG. 7 shows schematically the sequence of communication between the control unit and a sensor of the method according to the present invention for synchronization of the sensor.

In order to adjust variations in the propagation time (e.g. based on temperature changes) and to correct numerical rounding errors, at each scanning of the sensor data, the sample timer register may be read out at the same time. This information is used in order currently to readjust the final value, using the same method. As has been described above, a possible deviation between the sensor clock and the system clock is ascertained, and the values of the adjust register and/or the offset register are correspondingly adjusted.

In order to achieve stability in the regulation, the phase difference is observed over a plurality of measuring points. Before a new change in the adjust and offset registers, the time for measuring the correction factor should be awaited, in order to avoid oscillations in the regulation loop.

In yet another specific embodiment of the present invention, the sensor has an offset register.

If it is determined during measuring that the sensor has already run away by a certain value from the desired sample time pattern, it may be corrected additionally once within one or more samples.

The value in the offset register states, in this context, at what frequency the final value of the counter has to be incremented (or decremented) by 1, for example.

After the control unit has written a value into the offset register, the sensor circuit increments the final value in the counter of sensor time by 1, for example, and decrements for each sample the offset register by 1, for example, until 0 is reached.

What is claimed is:

1. A sensor for acquiring measured values and for outputting data samples, comprising:
    at least one first register for storing a sensor time, which includes time data on at least one of a phase position and a period of the data samples, the first register being readable out externally;
    at least one second register, which is write-able on externally, and by which at least one of the phase position and the period of the data samples is settable in the sensor; and
    an external control unit configured to read out the sensor time of the first register, compare the sensor time to a reference time stored in the external control unit, calculate correction values, and write the correction values into the second register and thereby set the at least one of the phase position and the period of future data samples in the sensor.

2. The sensor of claim 1, further comprising:
    at least one of at least one second adjust register, by which the period of data samples is settable in the sensor, and at least one second offset register, by which the phase position of data samples is settable in the sensor.

3. A sensor-fused system, comprising:
    at least two sensors, each of the sensors including:
        at least one first register for storing a sensor time, which includes time data on at least one of a phase position and a period of the data samples, the first register being readable out externally; and
        at least one second register, which is write-able on externally, and by which at least one of the phase position and the period of the data samples is settable in the sensor; and
    an external control unit configured to read out the sensor time of the first register, compare the sensor time to a reference time stored in the external control unit, calculate correction values, and write the correction values into the second register and thereby set the at least one of the phase position and the period of future data samples in the sensor.

4. A method for setting at least one of a phase position and a period of data samples in a sensor system or in a sensor-fused system, the method comprising:
    a) reading out a sensor time of a first register from the sensor by an external control unit;
    b) comparing the sensor time to a reference time of the external control unit;
    c) calculating correction values in the external control unit; and
    d) writing the correction values into a second register in the sensor by the external control unit and thereby setting the at least one of the phase position and the period of future data samples in the sensor;
    wherein the sensor system includes: at least one first register for storing the sensor time, which includes time data on at least one of the phase position and the period of the data samples, the first register being readable out externally; at least one second register, which is write-able on externally, and by which at least one of the phase position and the period of the data samples is settable in the sensor; and an external control unit by which at least the first register is readable and at least the second register is writable, and
    wherein the sensor-fused system includes: at least two sensors, each of the sensors including at least one first register for storing the sensor time, which includes time data on at least one of the phase position and the period of the data samples, the first register being readable out externally; at least one second register, which is write-able on externally, and by which at least one of the phase position and the period of the data samples is settable in the sensor; and an external control unit by which at least the first register is readable and at least the second register is writable.

5. The method of claim 4, wherein the setting of the at least one of the phase position and the period of future data samples in the sensor occurs so that the at least one of the phase position and the period of the data samples of one or more sensors are adjusted to a reference clock pulse or the reference time of the control unit.

6. The method of claim 4, further comprising:
    an additional sensor operable as an external control unit.

7. The method of claim 4, wherein a), b), c) and d) are carried out repeatedly, one after the other.

* * * * *